Sept. 8, 1970   R. L. HUGHES   3,527,530
SLIDE VIEWER
Filed Jan. 12, 1967   2 Sheets-Sheet 1
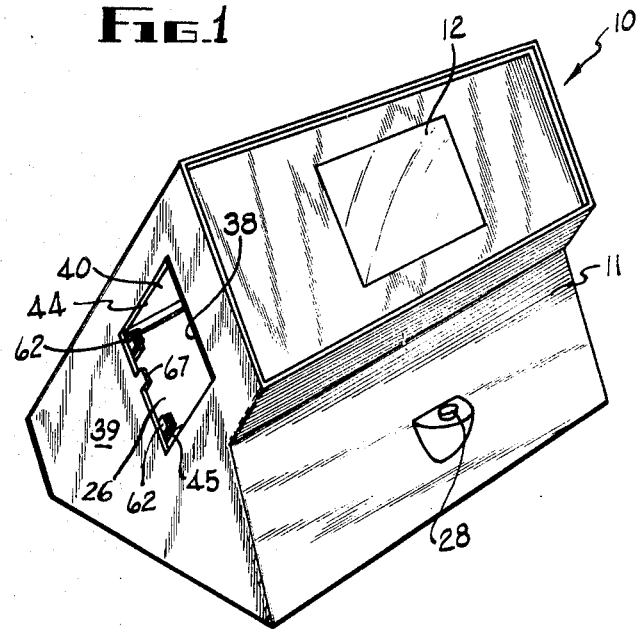
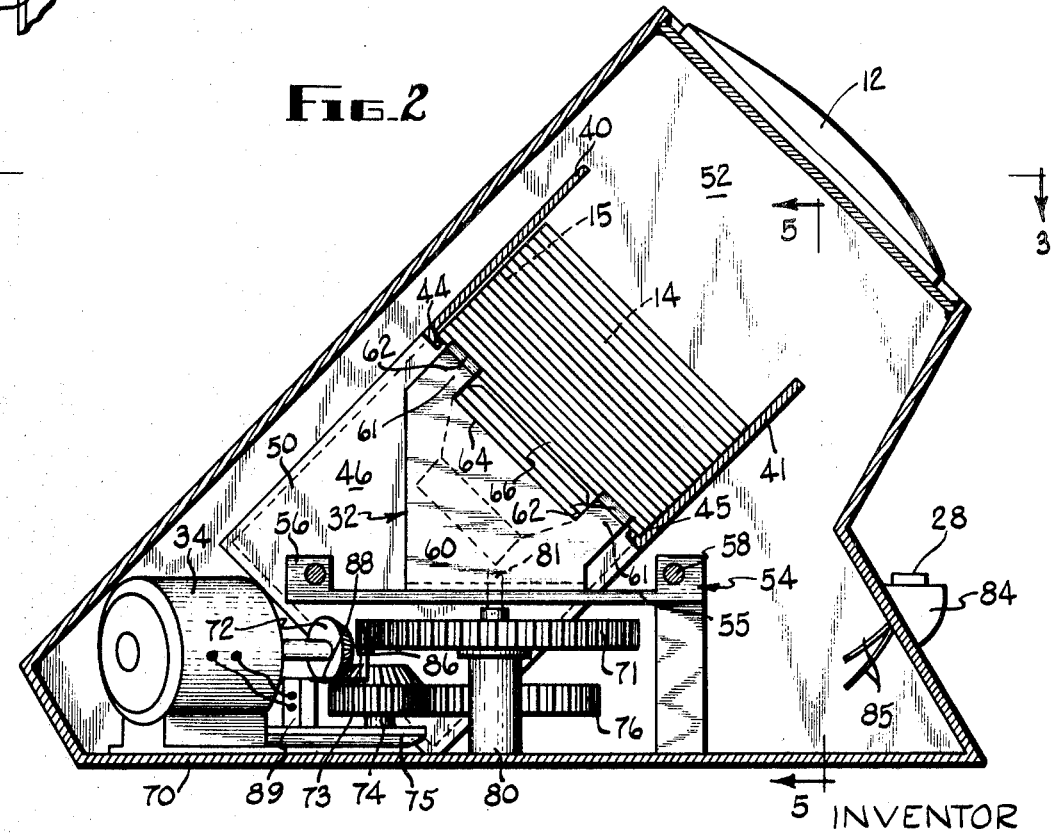
INVENTOR
ROBERT L. HUGHES
Thomas A. Briody
ATTORNEY Sept. 8, 1970             R. L. HUGHES             3,527,530

SLIDE VIEWER

Filed Jan. 12, 1967             2 Sheets-Sheet 2

INVENTOR
ROBERT L. HUGHES

Thomas A. Briody
ATTORNEY 3,527,530
SLIDE VIEWER
Robert L. Hughes, Saratoga, Calif., assignor to General
Electric Company, a corporation of New York
Filed Jan. 12, 1967, Ser. No. 608,804
Int. Cl. G09f 13/10
U.S. Cl. 353—112                                    5 Claims

ABSTRACT OF THE DISCLOSURE

A slide viewer apparatus with a simple, motor-driven slide pusher for automatically stripping the lowermost slide from a stack of slides in a compartment and transporting this slide to a viewing position in which the slide is illuminated for observing through a magnifying lens. Each subsequent slide abuts the trailing edge of a preceding slide and ejects the same from the viewing station to drop by gravity to form a stack in a collecting compartment.

---

This invention relates generally to viewers for transparent slides and, more particularly, to the simple, low cost slide viewers in which a slide is directly viewed by a person through a magnifying lens. This is in contrast to the more expensive and complex slide projectors in which a slide image is generated and projected into a screen so that the viewer sees the image on the screen rather than the slide itself. Slide viewers are often employed to sort and arrange slides prior to their placement in a magazine for use in a slide projector. Lacking an inexpensive automatic slide stacking and transfer mechanism, slide viewers, heretofore, have been manually operated to move a slide to and from a viewing position.

Accordingly, a general object of the present invention is to provide a slide viewer which automatically removes slides from a stack and re-stacks the slides after viewing, yet which, because of its low cost construction, can compete successfully from a cost standpoint with manually operated slide viewers.

Another object of the invention is to provide a slide viewer with a simple, slide changing mechanism for automatically transferring slides from a stack to a viewing station and for ejecting the slides from the viewing station to form a new stack.

A further object of the invention is to provide a slide viewer in which the slides are transferred by a motor driven transfer mechanism which is of simple and low cost construction as compared to slide changers employed in slide projectors heretofore.

Other objects and advantages of the invention will be apparent from the following description taken in connection with the accompanying drawings, in which:

FIG. 1 is a perspective view of a slide viewer embodying the novel features of the present invention;

FIG. 2 is an enlarged sectional view of the slide viewer of FIG. 1;

FIG. 6 is an enlarged fragmentary perspective view of a tab for engaging a slide.

Figure 3:
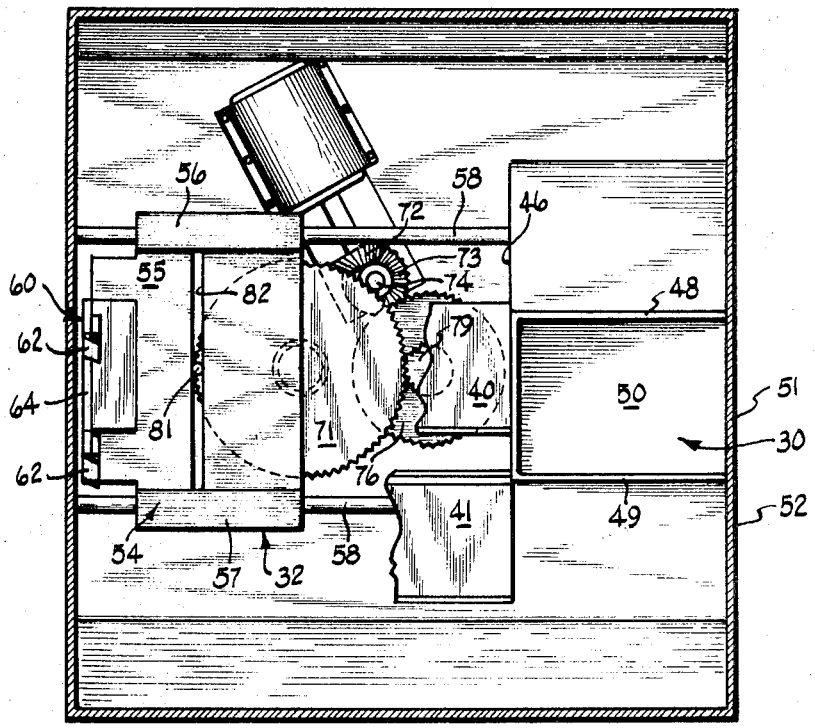
FIG. 3 is a sectional view taken along the lines 3—3 of FIG. 2.

As shown in the drawings for purposes of illustration, the invention is embodied in a slide viewer 10 having an outer housing 11 with a transparent viewing lens 12 disposed at an inclination to the horizontal to afford ease of viewing a slide in a viewing position beneath the lens 12. Herein, a second lens 14 is mounted and aligned internally in the housing by a bracket 15 to be parallel with the first lens 12 and intermediate the latter and a slide 16 (FIG. 4) at a viewing station. The slide in the viewing position is illuminated by a light source such as a bulb 18 disposed beneath the slide and, in this instance, a frosted glass window 19 which is placed between the light bulb and the slide to diffuse the light evenly over the entire transparent area on the slide. Thus, the viewer sees a magnified and illuminated object on the slide transparency when viewing the slide through the lens 12 and 14.

Figure 4:
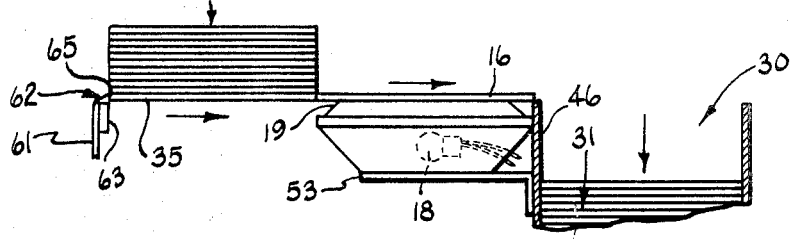
FIG. 4 is a diagrammatic view of the slide movement within the viewer.

In accordance with the present invention, a plurality of slides 25 to be viewed (FIGS. 2 and 4) are arranged in a stack in a compartment 26 in the housing 11 and, upon operation of a switch 28 (FIG. 1), the lowermost slide is transferred automatically from the stack to the viewing station by a novel slide changing mechanism 32 and, at the same time, a previously transferred slide 16 at the viewing position (FIG. 4) is automatically shifted out of the station and dropped into a slide collecting or storage compartment 30 (FIGS. 3 and 4) in which the slides are formed into another stack 31 (FIG. 4). To achieve the foregoing, the slide changing mechanism 32 (FIGS. 2 and 3) is driven by a power operator 34 and engages the outer edge of the lowermost slide 35 in the stack 25 (FIG. 4) to push it transversely in a substantially straight line path, to the right as viewed in FIG. 4, with its forward or inner edge abutting the rear edge of the previously viewed slide 16 and pushing the latter forwardly until it falls to the bottom of the collecting compartment 30. As successive slides are transferred and viewed, the viewed stack 31 is being accumulated in the collecting compartment.

In the present instance, access to the stack receiving compartment 26 is through a rectangular opening 38 formed in a vertical side wall 39 of the housing 11. The compartment is formed by upwardly inclined, parallel plates 40 and 41 (FIG. 2) which abut against and extend normally from the housing wall 39 to a vertical wall 46 defining the inner side of the receiving compartment 30. The plates 40 and 41 are secured to the housing wall 39 and the inner parallel wall 46 and are separated by a distance slightly greater than the width of the slide. As the lowermost slide is placed in the compartment, its lateral edges span and rest on inturned bottom flanges 44 and 45 extending inwardly from and along the full length of the plates 40 and 41.

The receiving compartment 30 is of a size similar to that of the first compartment, but is disposed at a lower level so that the slides leaving the flanges 44 and 45 and the viewing position fall by gravity between parallel, inclined walls 48 and 49 of the receiving compartment to a lower bottom wall 50. The inclined and bottom compartment walls are fastened to the housing side wall 52 and extend inwardly to the inner vertical compartment wall 46 which is spaced from and parallel to the other vertical housing wall 52. The inner wall 46 extends vertically from the terminal ends of the slide supporting flanges 44 and 45 downwardly to the bottom wall 50 as best seen in FIG. 2. Opposite the inner wall 46, an access opening similar to opening 38 is provided in the housing wall 52 so that the viewer may remove the viewed stack of slides. A bracket 53 (FIG. 4) is fastened to the inner side of the inner wall 46 and extends toward the center of the housing to support the bulb 18 and glass window 19 beneath the slide at the viewing position. Another support bracket (not shown) extends inwardly from the sidewall 52 and holds the lens 14 in alinement with the lens 12 and bulb 18.

To transfer the slide from the bottom of the stack 25 in the first compartment 26 into the viewing position beneath the lens 14, the slide changing mechanism includes a slide pusher 54 having a carriage base 55 (FIG. 3) extending generally horizontal with spaced glide blocks 56 and 57 fastened on its front and rearward edges. Each of the glide blocks is formed with a cylindrical bore through which is projected one of a pair of parallel slide rods 58 extending transversely of and fastened at one end to the vertical housing wall 39. At its other end, one rod is fastened to the inner vertical wall 46. The other rod extends in front of the compartments and is fastened at its other end to the other vertical housing wall 52. The rods guide the slide pusher 54 along a straight line path between a slide receiving position at the receiving compartment 26 and the viewing position beneath the viewing lens.

To push the slides, an upstanding bracket 60 is secured to the left end of the carriage base 55 and is formed with upwardly and forwardly inclined fingers 61 carrying slide engaging tabs 62. The latter are formed by a bent, hinged, plastic plate having a lower slide 62a (FIG. 6) fastened to the top of a support block 63 on the finger 61, and having an upper inclined side 62b hinged to the lower side at integral hinge 62c. The tabs are fixed in the finger to be disposed for movement parallel to and inward of the walls 40 and 41 and the upper leading edge 65 of each tab engages the lowermost slide. More specifically, leading edges 65 on the upper part of the tabs abut the rear edge of the slide 16 along the outer marginal sides of the slide, which sides are stiffened by the transverse cardboard strips holding the transparency. On the forward stroke of the slide pusher, the tabs 62 abut only the rear edge of the lowermost slide and move beneath the other slides in the stack 25 as the lowermost slide is stripped from the stack and transferred to the viewing position over the light source 18. On the return (leftward) stroke of the slide pusher, however, the stack of slides engages the inclined, upper surface of the pusher tabs 62 and bend the sides 62b downwardly to pass under the stack. When the leading edges 65 of the tabs move to the right of the stack 26, the side 62b flexes upwardly about its hinge with the leading edge 65 now in position to abut the trailing edge 66 of the now lowermost slide of the stack. To prevent pushing of the stack outwardly from the access opening 26 on the return stroke of the slide pusher, a small stop projection 67 extends upwardly from the lower edge wall of the access opening 26 to abut the rear edge of the lowermost side.

While the power operator may take various forms such as a reciprocating motor, in this instance it is a rotary electric motor of the small D.C. type energized by a rechargeable battery (not shown) of conventional manufacture. It will be understood, however, that an A.C. motor may be employed and driven directly from an A.C. source. Herein, the motor is secured to the housing base 70. The bulb 18 is connected to the electrical source employed for the motor 34.

Figure 5:
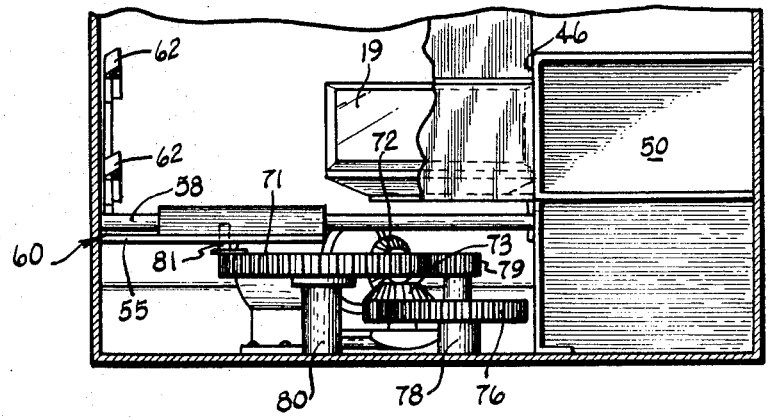
FIG. 5 is a fragmentary sectional view taken along the line 5—5 of FIG. 2.

To reciprocate the slide pusher 54 and automatically transfer a slide from the stack 25 to the viewing position, the motor 34, through a train of reduction gears, turns a driver 71 which has a pin and slot connection with the base 55 of the slide pusher to convert the rotary motion of the motor into rectilinear reciprocating movement of the pusher slide. The motor drive shaft, which is horizontal, thus carries a beveled pinion 72 meshing with a combined bevel and spur gear 73 journaled on a stub shaft 74 (FIG. 2) on a motor bracket 75. The gear 73 drives an idler gear 76 fixed to an outer upstanding sleeve 78 which is journaled for rotation on an interior stub shaft (not shown), the latter upstanding rigidly from the housing base plate. That sleeve carries a smaller spur gear 79 which meshes with a larger spur gear forming the slide driver 71. Here, the driver 71 is journaled on another stub shaft 80 upstanding rigidly from the housing base plate (FIG. 5).

The pin and slot connection between the driver 71 and the carriage base plate 55 herein comprises a pin 81 fixed eccentrically to and at the peripheral edge of the driver and project upwardly into an elongated slot 82 in the carriage base 55. The slot extends normal to the parallel slide rods 58 and, as the pin moves in its circular path, it has simultaneous right angle components of movement, one component causing the pin to traverse the slot 82 while the other component is causing the slide pusher to move along the slider rods 58. This longitudinal component shifts the carriage base 55 back and forth along the slide rods.

To initiate a slide changing operation, the operator depresses the pushbutton 28 to close a pair of normally open electrical switch contacts 84 (FIG. 2) of an electrical circuit including the leads 85 from these contacts to the motor 34. The motor 34 thereby is energized and the driver 71 is turned through one revolution, after which, through suitable circuitry including a switch 89 and operating mechanism therefor, the motor is deenergized. Herein, the one revolution switch is normally closed and is connected parallel with the normally open pushbutton switch. An operator 88 for the normally closed switch is positioned for engagement by a depending projection 86 on the underside of the driver 71 for opening of the switch and deenergization of the motor 34 when the driver disc has turned through one revolution and the slide pusher 54 has come to rest in a position to advance the succeeding slide in the stack.

To summarize the operation, the viewer operator inserts a stack of approximately 20 or 30 slides through the access opening 38 into the storage compartment 26 with the lowermost slide resting on the support flanges 44 and 45. With the bulb illuminated, the operator then closes the switch 28 on the front panel of the housing to complete a circuit around the then open one-revolution switch and to energize the motor 34 which turns the driver 71 with the pin 81 forcing the slide pusher 54 forward to bring the leading edges 65 on the pusher tabs 62 against the rear edges of the lowermost slide and then push forwardly across the support flanges 44 and 45 to a position over the frosted glass 19 at the viewing station. As the driver 71 starts its movement, the depending pin 86 leaves the switch operator 88 and the one-revolution switch closes to continue energization of the motor after the pushbutton switch opens. On the latter half of the revolution of the disc, the pin 81 returns the slide pusher 54 with upper sides 62b of the tabs flexed downwardly and sliding under the rear marginal edges of the now lowermost slide of the stack until the leading edges 65 of the tabs clear the right edge of the second slide. At this time, the operating pin 86 on the disc opens the microswitch 89 to deenergize the motor.

The light bulb 18 provides illumination and the viewer may view the object on a transparent portion of the slide by looking through the lenses 12 and 14 for as long as he desires. When the next slide is to be viewed, the button 28 is again depressed and the second slide is transferred by the slide pusher 54 to abut the forward edge of the second slide against the trailing edge of the first slide and as the slide pusher moves forwardly the first slide is ejected from the ends of the flanges 44 and 45 and falls into the receiving compartment 30. After the trailing rear edge of the first slide moves rightwardly of the chamber wall 46, the first slide drops downwardly in the receiving compartment to its bottom wall 50. With successive operations of the switch button 28, the slides are stripped one by one from the bottom of the storage stack, transferred into the viewing position, and ejected into the receiving compartment to form a viewed stack of slides. The last slide of the storage stack can be removed from the viewing station by the insertion of a dummy slide or by the operator inserting his fingers into the access opening at the compartment 30 and grasping the edge of the last slide and pulling the same from the viewing station.

From the foregoing, it will be seen that the slide viewer automatically transfers slides from a storage stack into a viewing station and causes the viewed slides to be ejected into a stack in a holding compartment. Also, the slide transfer mechanism is extremely simple and of low cost construction as compared with transfer mechanisms for automatic slide projectors.

While a preferred embodiment of the invention has been shown in the drawings and described herein, it is not intended to limit the invention by such disclosure, but it is intended to cover all modifications and alternative constructions coming within the spirit and scope of the invention as defined in the appended claims.

The invention claimed is:

1. In a slide viewing apparatus, the combination of,
a housing,
a light source in the housing to illuminate a slide in a viewing position,
a magnifying lens in the housing through which the viewer sees a magnified object on the slide disposed at said viewing position,
means for holding a stack of slides for transfer one at a time into the viewing position,
a transfer slide means for sliding the lowermost slide from the stack and into the viewing position,
a compartment located in said housing for collecting the viewed slides into a stack as the latter are ejected from the viewing position, and
a switch controlled drive means including a motor for operating said slide means to transfer automatically a slide from the stack into the viewing position and to cause an ejection of a viewed slide into the collected stack within said compartment.

2. In a sliding viewing apparatus, the combination of,
an optical viewing means in the housing including a light source for illuminating a slide at a viewing position and a lens for magnifying the slide being viewed,
a storage compartment in the housing on one side of the optical viewing means for receiving a stack of slides,
a slide collecting compartment in the housing on the other side of the optical viewing means and disposed beneath the level of the viewing position,
a reciprocating slide pusher mounted in the housing beneath the storage compartment for engaging a rear edge of the bottom slide of the stack and sliding the same to the viewing position with forward movement of the slide pusher, the slide pusher in a subsequent forward movement operating to shift a slide from the storage compartment to engage the preceding slide and push the latter away from the viewing position and into a position to drop into the collecting compartment, and
a drive means including a selectively operable motor for reciprocating the slide pusher to transfer slides automatically from the storage compartment and into the viewing station for automatic ejection to the collecting compartment during a subsequent operation of the slide pusher.

3. In a slide viewing apparatus, the combination of,
a housing,
a light means in the housing to illuminate a slide at a viewing position in the housing,
a compartment in the housing on one side of the viewing station for receiving a stack of slides for viewing,
means in the housing for supporting the slides for movement and from the compartment to the viewing position along a substantial straight line path which is normal to the line of viewing,
a slide receiving compartment in the housing for receiving slides transferred from the viewing position by the movement of a succeeding slide into the viewing position,
a bottom support in said receiving compartment disposed at a level beneath said support means so that the slides ejected from the viewing position drop down and form a stack on the bottom support in the receiving compartment,
a slide pusher mounted in the housing to reciprocate parallel to the path of slide movement and engageable with the rear edge of the lowermost slide in the first compartment to push such slide from that compartment and into the viewing position, and
operating means including a motor for selectively reciprocating said slide pusher to transfer automatically a slide from the storage compartment to the viewing station and to eject a preceding slide from the viewing station for gravitation into a stack in the receiving compartment.

4. The combination of claim 3 in which the operating means includes a rotatable driver having a pin and slot connection with said slide pusher to reciprocate the latter as an incident to rotation of the driver.

5. The combination of claim 4 in which the operating means includes a manually operable switch to energize said motor to rotate the driver and a further switch operable by the driver to de-energize said motor after a predetermined amount of rotation whereby said slide pusher transfers one slide and returns to a position for pushing a subsequent slide.

References Cited

UNITED STATES PATENTS

| 1,099,431 | 6/1914 | Eckschlager | 40—79 |
| 2,849,814 | 9/1958 | Rideout | 40—79 |
| 3,001,445 | 9/1961 | Mulch et al. | 40—79 XR |
| 3,015,251 | 1/1962 | Pollan | 40—79 XR |
| 3,284,937 | 11/1966 | Weggeland | 40—78 |

FOREIGN PATENTS 340,931  5/1904  France.

NORTON ANSHER, Primary Examiner

R. P. GREINER, Assistant Examiner

U.S. Cl. X.R.

40—78, 106.1